US008272059B2

(12) United States Patent
Freeman

(10) Patent No.: US 8,272,059 B2
(45) Date of Patent: Sep. 18, 2012

(54) SYSTEM AND METHOD FOR IDENTIFICATION AND BLOCKING OF MALICIOUS CODE FOR WEB BROWSER SCRIPT ENGINES

(75) Inventor: Robert G. Freeman, Chamblee, GA (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 12/127,995

(22) Filed: May 28, 2008

(65) Prior Publication Data

US 2009/0300764 A1    Dec. 3, 2009

(51) Int. Cl.
*H04L 29/06* (2006.01)

(52) U.S. Cl. ............ 726/24; 726/22; 711/170; 711/154; 711/165; 711/127; 711/163

(58) Field of Classification Search ............... 726/24
See application file for complete search history.

(56) References Cited

U.S. PATENT DOCUMENTS

| 6,832,302 | B1 * | 12/2004 | Fetzer et al. | 711/170 |
|---|---|---|---|---|
| 7,484,239 | B1 * | 1/2009 | Tester et al. | 726/2 |
| 2003/0065926 | A1 * | 4/2003 | Schultz et al. | 713/188 |
| 2003/0172293 | A1 * | 9/2003 | Johnson et al. | 713/200 |

OTHER PUBLICATIONS

Sotirov (Heap Feng Shui in JavaScript), presented at BlackHat Europe, Mar. 2007, Amsterdam.*
Hsu et al. (HSP: A Solution Against Heap Sprays), The Journal of Systems and Software 83 (2010), pp. 2227-2236.*
CyberInsecure.com, RealPlayer Vulnerability Exploited in the Wild, Apr. 3, 2008. http://64.233.167.104/search?q=cache:o9ARsCUpj4YJ:cyberinsecure.com/replayer-vulnerability.

* cited by examiner

*Primary Examiner* — Taghi Arani
*Assistant Examiner* — Narciso Victoria
(74) *Attorney, Agent, or Firm* — Arthur J. Samodovitz

(57) ABSTRACT

A system and method to protect web applications from malicious attacks and, in particular, a system and method for identification and blocking of malicious code for web browser script engines. The system includes at least one module configured to protect web applications from malicious attacks by detecting an occurrence of heap spraying and blocking the occurrence of heap spraying.

20 Claims, 3 Drawing Sheets

SYSTEM AND METHOD FOR IDENTIFICATION AND BLOCKING OF MALICIOUS CODE FOR WEB BROWSER SCRIPT ENGINES

FIELD OF THE INVENTION

The invention generally relates to a system and method to protect web applications from malicious attacks and, in particular, a system and method for identification and blocking of malicious code for web browser script engines.

BACKGROUND

Malware or malicious attacks on computing systems is becoming an ever-increasing security concern to companies and individuals. The most common pathway for Malware to infect computing systems is through the Internet, by email and the World Wide Web.

Malware comes in many different forms designed to infiltrate or damage a computer system without the owner's informed consent. For example, Malware can include computer viruses, worms, and trojan horses, as well as other malicious and unwanted software. However, for a malicious program to accomplish its goals, it must be able to perform its malicious objectives without being deleted, shutdown or blocked. For this reason, concealment methods assist in the installation and running of the malware.

Intrusion detection systems (IDS) are designed to detect malware or other unwanted manipulations of computer systems, mainly through the Internet. For example, IDS are used to detect several types of malicious behaviors that can compromise the security and trust of a computer system. This includes network attacks against vulnerable services, data driven attacks on applications, host based attacks such as privilege escalation, unauthorized logins and access to sensitive files, and malware, itself.

Typically, IDS are composed of several components including sensors, consoles and a central engine. Illustratively, a sensor generates security events, and a console is designed to monitor events and alerts and control the sensors. The central engine records events logged by the sensors and uses rules to generate alerts from received security events. There are several ways to categorize IDS depending on the type and location of the sensors and the methodology used by the engine to generate alerts. Types of IDS include network-based intrusion-detection systems (NIDS), passive systems and reactive/blocking systems such as intrusion prevention systems (IPS).

Typically IDS directly identify the malware or other malicious attacks in transit. However, malicious attacks are becoming ever increasingly sophisticated in their obfuscation that it is sometimes difficult or impossible to detect malware attacks by use of IDS as it is happening. Thus, only specialized anti-malware IDS systems may detect the Malware only after it is already completely uploaded and active on the computing system.

Typically web browser exploits require shellcode to execute malicious code on a remote computing system. A shellcode is a small piece of code used as the payload in the exploitation of software vulnerability. Such exploits are either due to a buffer overflow or a memory corruption condition. Either due to the bug design (in the case of memory corruption) or operating restrictions (in the case of buffer overflows) it is necessary for the shellcode to exist in the browser's heap memory.

In order for the malicious attacker to get their shellcode to heap addresses, it is necessary to "spray" the heap with redundant blocks of memory combining no-operation "sleds" and actual shellcode. As is commonly known, a heap spray is a technique used in exploits to facilitate arbitrary code execution. The term is also used to describe the part of the source code of an exploit that implements such technique. In general, the spraying code puts a certain sequence of bytes at a predetermined location in the memory through an indirect process by allocating many blocks (potentially of a large size individually) on the heap and filling the bytes in these blocks. This technique sees widespread use in exploits for web browsers.

The use of heap spraying has proved simple enough that even novice "hackers" can quickly write reliable exploits for many vulnerabilities in web browsers and web browser plugins. Heap sprays for web browsers are commonly implemented in JavaScript. The heap spraying creates large Unicode strings with the same character or combinations of characters (representing a no-operation "sled" and or computer code) repeated many times by concatenating starting with a string of one character and concatenating it with itself over and over. This causes the length of the string to grow exponentially up to the maximum length allowed by the scripting engine. When the maximum length (or an arbitrary lower length) is reached, the heap spraying code starts to make copies of the long string and stores these in an array, up to the point where enough memory has been sprayed. However, when obfuscated, IDS cannot detect nor thwart (stop) the heap spray in order to the defeat the malicious attack. Furthermore, non-obfuscated heap sprays are both rarely observed and still present many challenges for IDS detection.

Accordingly, there exists a need in the art to overcome the deficiencies and limitations described hereinabove.

SUMMARY

In a first aspect of the invention a system comprises at least one module configured to protect web applications from malicious attacks by detecting an occurrence of heap spraying and blocking the occurrence of heap spraying.

In another aspect of the invention, a method for preventing corruption of a web browser. The method comprises providing a computer infrastructure operable to determine when a string concatenation or total memory footprint of a script thread exceeds a threshold value which is indicative of a heap spraying event, and block the heap spray event.

In another aspect of the invention, a computer program product for protecting web applications from malicious attacks. The computer program product comprises: a computer readable medium; first program instructions to detect an occurrence of heap spray; and a second program instructions to block the occurrence of the heap spraying upon the first program instructions detecting the heap spray thereby preventing execution of a shellcode. The first and second program instructions are stored on the computer readable media.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
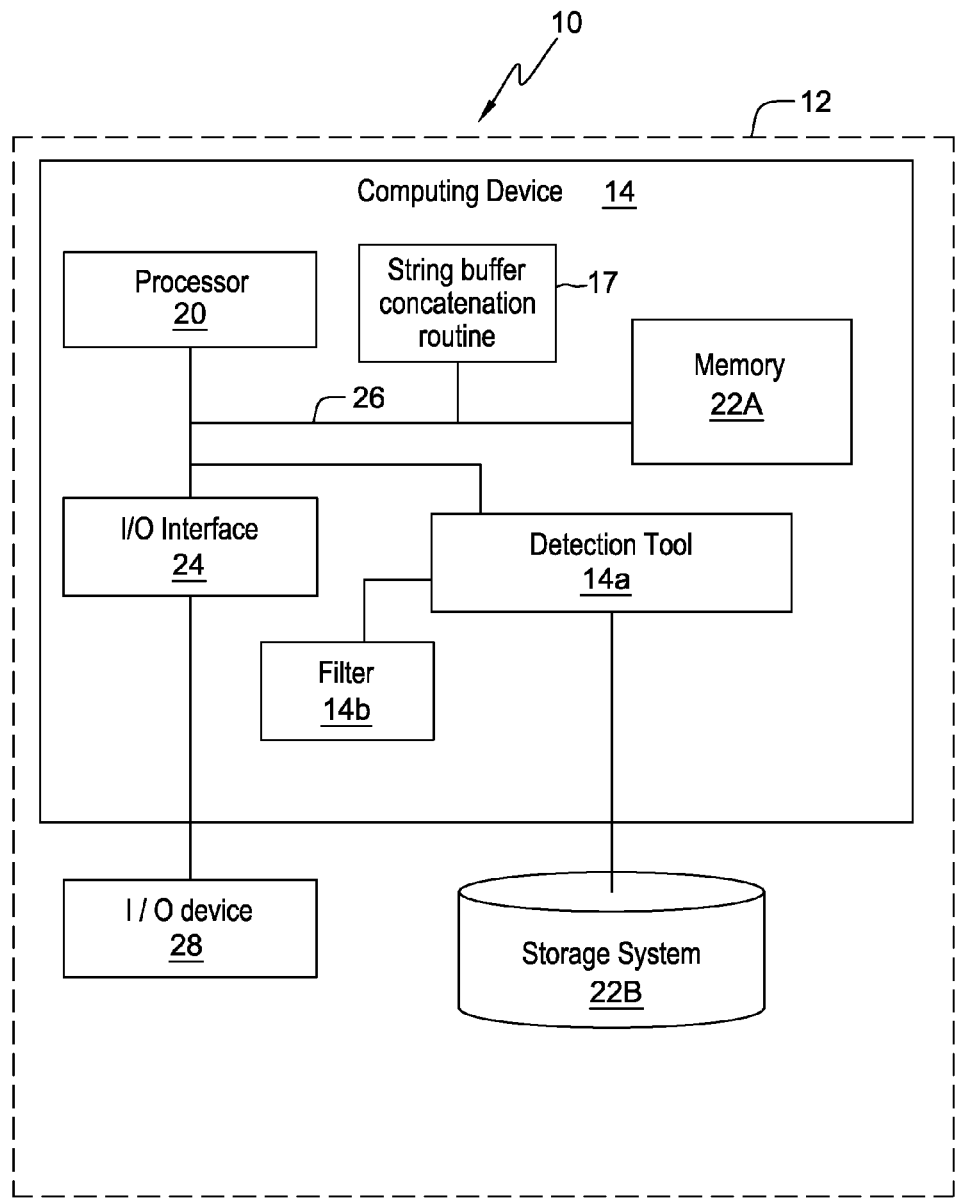
FIG. 1 shows an illustrative environment for implementing the steps in accordance with the invention.

The invention generally relates to a system and method to protect web applications from malicious attacks and, in particular, a system and method for identification and blocking of malicious code for web browser script engines. In implementation, the invention provides the ability to identify and block a heap spray. Advantageously, by detecting the heap spray, it is possible to block the malicious attack from spraying (compared to merely identifying a problem) thereby preventing shellcode execution. For example, if the heap spray is stopped early, so too is the remote code execution. This is due to the fact that the present invention can detect the occurrence of spraying prior to enough memory being allocated to execute the attack.

Also, having the ability to identify and block heap sprays dramatically reduces the risk of web browser exploitation since they are ubiquitous with such exploitation. Similarly, reducing the amount of web browser exploitation reduces the amount of malware installations, as this is a common theme for remote shellcode execution. The principles to remediation as applied by the present invention can be applied to any closed-source (e.g., JS and Visual Basic Script) as well as open-source libraries.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or In the context of this document, a computer-usable or computer-readable medium may be any medium that can store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a Detection Tool (module or program code) 14a configured to make computing device 14 operable to perform the services described herein. The Detection Tool 14a can be implemented as one or more program code stored in memory 22A as separate or combined modules. In an illustrative example, the Detection Tool 14a is configured to identify and block a heap spray that is used to prevent shellcode execution. In this way, the Detection Tool 14a can prevent memory corruption and buffer overload vulnerabilities. More specifically, the Detection Tool 14a is configured to detect the occurrence of heap spraying prior to enough memory being allocated to execute the shellcode. In this way, advantageously, the Detection Tool 14a dramatically reduces the risk of web browser exploitation by reducing malware installations from shellcode execution.

In embodiments, the solution presented by the present invention is to hook, either in source code or binary form, a string buffer allocation routine and/or string buffer concatenation routine in each script library supported by a given browser. The present invention can support JavaScript and Visual Basic Script libraries, as well as other closed or open source libraries.

The present invention contemplates two techniques implemented by the Management Tool 14a to prevent malicious attacks. These techniques include string allocation requests and tracking memory utilization per thread.

In string allocation requests, the Detection Tool 14a knows the total allocation size for the string buffer allocation stage and/or string buffer concatenation routine 17. This known value is compared against a maximum value known to be indicative of a malicious event, e.g., an amount of memory that is indicative of a heap spray event. The maximum value may range from 10 or more kilobytes to 100 or more megabytes depending on a specific application. For example, a string may range from a sentence or two of information to hundreds of megabytes for Web 2.0 applications, which may require all script code. The maximum value may be made tunable via a filter 14b.

Once the maximum value is reached, the Detection Tool 14a will flag the event as a heap spray and opt to block the allocation. Once the allocation is block, an error message can be returned, but the underlying web browser application would not break in any way, e.g., the web browser application will continue to run. In embodiments, although the web browser application will continue to operate, certain functions of the web browser applications may cease to operate as the web browser application runs on a tokenization of commands. In any event, the Detection Tool 14a will stop the malicious attack prior to enough memory blocks being infected to execute the malware. Thus, in embodiments, the script that is running will cease to operate properly. Although there may be some false positives, depending on the maximum value, this should be an acceptable risk.

In the tracking memory utilization per thread embodiment, the Detection Tool 14a could identify risky script behavior during the lowest-level memory allocation routine (if hooked). For example, if total allocations on a particular thread exceed a maximum value, the Detection Tool 14a will flag this as a heap spray condition and subsequently block the action. Although, the Detection Tool 14a will know with less certainty that an actual heap spray has occurred versus inefficient or otherwise disastrous code, the Detection Tool 14a can still deny an allocation on a particular script thread. The outcome would be identical to that in the string allocation requests technique, i.e., returning of an error message but not breaking of the web browser application in any way.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code such as the Management Tool 14a, which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. In this case, the service provider can create, maintain, deploy, support, etc., the computer infrastructure that performs the process steps of the invention for one or more customers. These customers may be, for example, any third party computing system. In return, the service provider can receive payment from the customer(s) under a subscription and/or fee agreement and/or the service provider can receive payment from the sale of advertising content to one or more third parties.

Exemplary Processes

Figure 2:
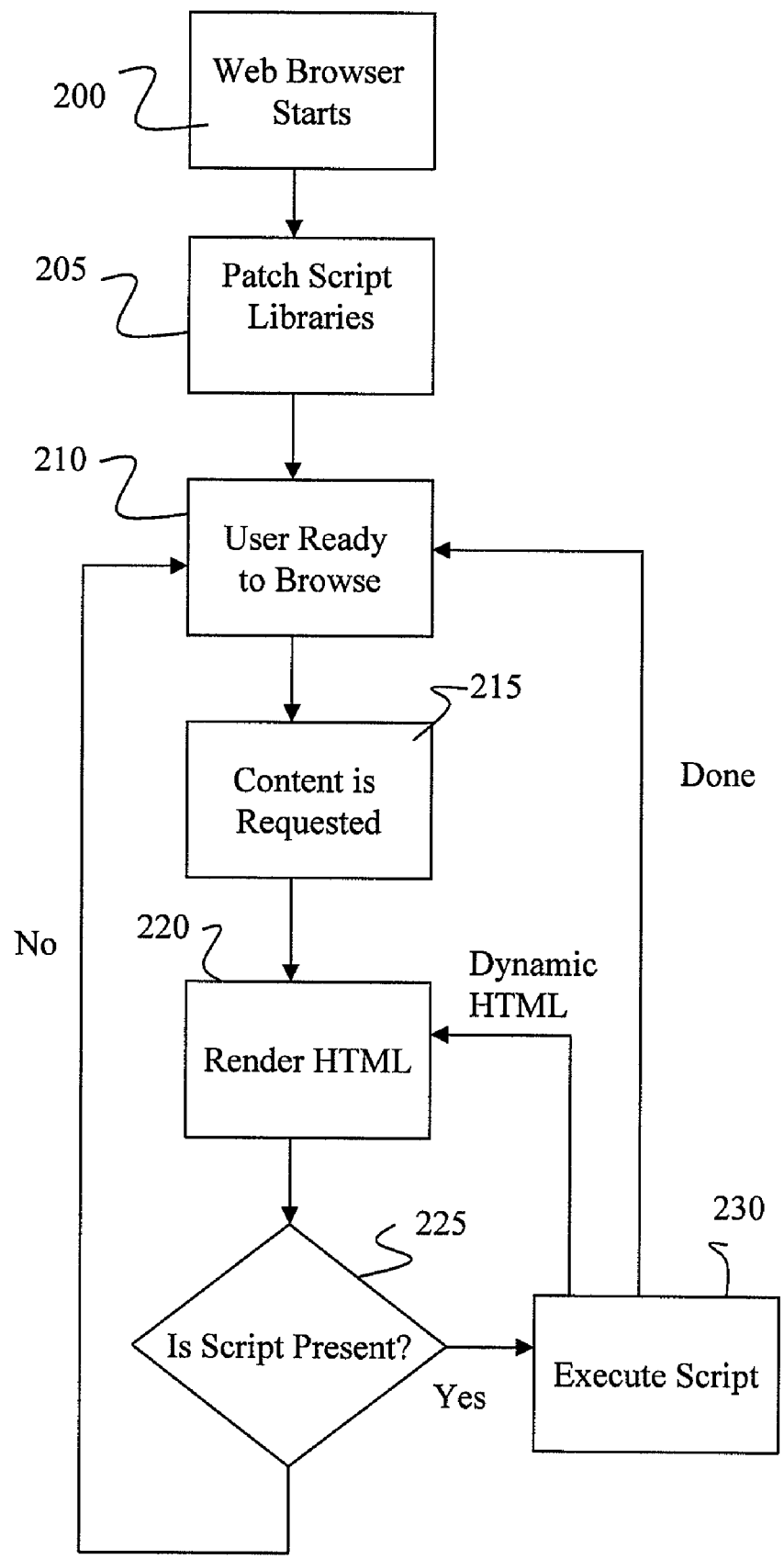
FIGS. 2-3 show flow charts of exemplary processes in accordance with aspects of the invention.
Figure 3:
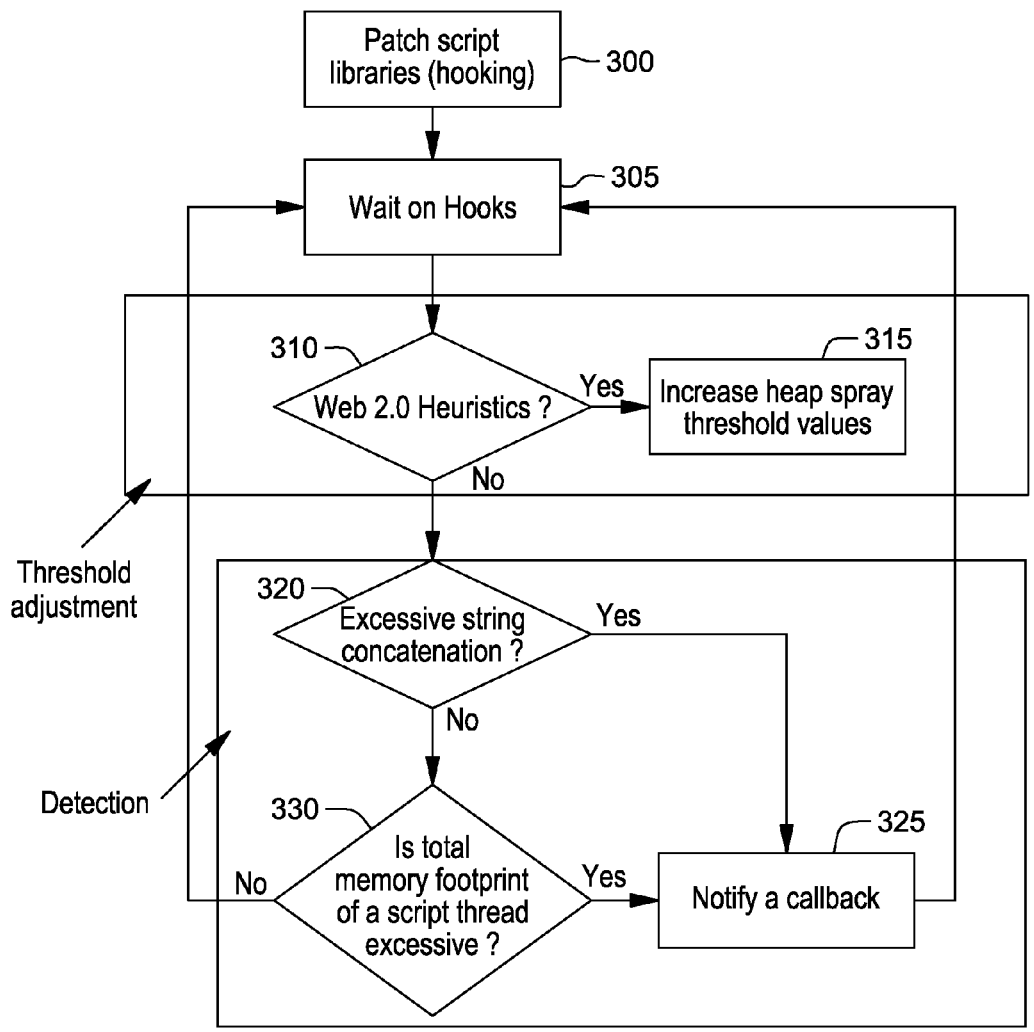

FIGS. 2 and 3 illustrate exemplary processes in accordance with the present invention. The steps of FIGS. 2 and 3 may be implemented on the computer infrastructure of FIG. 1, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

FIG. 2 shows a system overview with anti-heap spray in accordance with aspects of the invention. At step 200, the web browser is started. In embodiments, the control program (e.g., detection logic) of the present invention can be implemented as a browser plug-in which would configure when the user starts the web browser. At step 205, a patch to the script libraries is initiated. In this processing, patches will be provided to entry points of the relevant functions in order to "jump" to the detection logic implementing the present invention. This may be achieved by, for example, in the content of a web browser plug-in or in a secondary process with debug privileges.

At step 210, the user is ready to browse. At this processing stage, once everything is loaded/patched, the program control will be in a default state. At step 215, the user begins to browse the World Wide Web. At step 220, HTML is rendered.

At step 225, a determination is made as to whether a script is present. If a script is not present, the control logic will return to step 210. If the script is present, at step 230, the script is executed and the process returns to step 210. In embodiments, at step 230, the script being executed may be dynamic HTML (DHTML). Those of skill in the art should understand that DHTML is frequently used by Web 2.0 applications. When DHTML is added or modified, by a script engine, the web browser will be informed of the new content that needs rendering.

During script execution, the patches will cause the code execution path to travel through the detection logic of the present invention at which time a determination may be made as to whether there is a heap spray event facilitating malware loading onto the computing system. This is discussed in more detail in FIG. 3, below. It is noted that the remediation methods of the present invention will not crash the browser.

FIG. 3 shows a processing flow executing the detection logic of the present invention. At step 300, a patch is provided to script libraries of the web browser. In embodiments, the script libraries may include open source or closed source libraries. The processes of step 300 are provided prior to web content requests, either by default or by the end user or service provider. In further embodiments the hooks are passive and are encountered while the script processing is active by the web browser or system, for example.

The patch, in embodiments, permits the program control to temporarily take control to determine whether there is a malicious attack occurring on a computing system and more specifically on a web browser, as described herein. For example, the patch allows the program control to peek into what values are being passed internally in the script engine and stake steps to eliminate the threat with little or no impact to the end user experience. In the event that the string concatenation patch does not observe the heap spray mechanism, a second set of patches that exist at a lower level will keep track of the total memory utilization by the script thread. This may work with a different threshold value.

At step 305, the process waits on the hooks. In embodiments, the present invention is reactive and may not be triggered by all scripts, depending on the threshold (maximum) values set by the user or service provider.

At step 310, the program control makes a determination as to whether there is a Web 2.0 heuristic. The Web 2.0 heuristics may be heuristics which interpret heavy interaction with multiple Document Object Model (DOM) methods and properties as relating to Dynamic HTML (DHTML) due to Web 2.0 applications. This determination, although, optional, is used to set the maximum threshold values for a Web 2.0 application. For example, if a Web 2.0 heuristic is found, at step 315 the maximum heap spray value is increased to meet the requirements of the Web 2.0 heuristics. In embodiments, the value for the total memory usage per script thread is not lower than the value for string allocation/concatenation. The processes of steps 210 and 215 may be self-adjusting threshold logic.

At step 320, the program control makes a determination as to whether there is an excessive string concatenation. If so, at step 325, a callback is notified. That is, in embodiments, the callback decides what steps to take to eliminate or notify a user of the threat. This may include, for example, denying the memory script in progress, terminating the script in progress, notifying the logging mechanism and/or user, etc.

If an excessive string is not found at step 325, the process continues to step 330. At step 330, the program control makes a determination as to whether the total memory footprint of a script thread exceeds a threshold value, e.g., exceeds a maximum user set value (or, in embodiments, the Web 2.0 heuristics adjusted value (versus string allocation/concatenation size evaluation). If so, the process continues to step 325, as discussed above. If not, the process returns to step 305.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for limiting malicious heap spraying by a malicious program which makes repeated requests to concatenate another copy of a character string onto an existing concatenation of copies of the character string, the method comprising the steps of:

a legitimate program function repeatedly concatenating another copy of the character string onto an existing concatenation of copies of the character string in response to each of the respective repeated requests by the malicious program;

a computer determining whether a total length of the copies of the character string already concatenated by the legitimate program function in response to the repeated requests of the malicious program exceeds a predetermined threshold indicative of malicious heap spraying, and if so, the computer blocking the malicious program, and if not, the computer not blocking the malicious program, and the legitimate program function further concatenating other copies of the character string onto an existing concatenation of copies of the character string in response to additional requests by the malicious program to concatenate the character string.

2. The method of claim 1, wherein the malicious program and legitimate program function are installed in the computer.

3. The method of claim 1, wherein the legitimate program function is part of a web browser.

4. The method of claim 1, wherein the computer blocks the malicious program by terminating the malicious program.

5. The method of claim 1, wherein the computer blocks the malicious program by denying a memory allocation needed to store at least part of the concatenated character string in the computer.

6. The method of claim 1, further comprising the step of the computer hooking the legitimate program function to detect a total length of the concatenated character string, and wherein the step of the computer determining whether the total length of the copies of the character string already concatenated by the legitimate program function exceeds the predetermined threshold is responsive the hooking step.

7. A computer program product comprising one or more computer-readable tangible storage devices and computer-readable program instructions which are stored on the one or more storage devices and when executed by one or more processors of the computer of claim 1 perform the method of claim 1.

8. The computer of claim 1, the computer comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

9. A computer program product for limiting malicious heap spraying by a malicious program which makes repeated requests to a legitimate program function to concatenate another copy of a character string onto an existing concatenation of copies of the character string, the computer program product comprising:

one or more computer-readable tangible storage devices and program instructions stored on at least one of the one or more storage devices, the program instructions comprising:

program instructions to determine whether a total length of the copies of the character string already concatenated by the legitimate program function in response to the repeated requests of the malicious program exceeds a predetermined threshold indicative of malicious heap spraying, and if so, block the malicious program, and if not, not block the malicious program to allow the legitimate program function to further concatenate other copies of the character string onto an existing concatenation of copies of the character string in response to additional requests by the malicious program to concatenate the character string.

10. The computer program product of claim 9, wherein the malicious program and legitimate program function are configured for installation in a same computer.

11. The computer program product of claim 9, wherein the legitimate program function is part of a web browser.

12. The computer program product of claim 9, wherein the program instructions block the malicious program by terminating the malicious program.

13. The computer program product of claim 9, wherein the program instructions block the malicious program by denying a memory allocation needed to store at least part of the concatenated character string in a computer.

14. The computer program product of claim 9, further comprising program instructions, stored on at least one of the one or more storage devices, to hook the legitimate program function to detect a total length of the concatenated character string, and wherein the program instructions to determine whether the total length of the copies of the character string already concatenated by the legitimate program function exceeds the predetermined threshold is responsive the program instructions to hook the legitimate program function to detect a length of the concatenated character string.

15. A computer system for limiting malicious heap spraying by a malicious program which makes repeated requests to a legitimate program function to concatenate another copy of a character string onto an existing concatenation of copies of the character string, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine whether a total length of the copies of the character string already concatenated by the legitimate program function in response to the repeated requests of the malicious program exceeds a predetermined threshold indicative of malicious heap spraying, and if so, block the malicious program, and if not, not block the malicious program to allow the legitimate program function to further concatenate other copies of the character string onto an existing concatenation of copies of the character string in response to additional requests by the malicious program to concatenate the character string.

16. The computer system of claim 15, wherein the malicious program and legitimate program function are installed in the computer system.

17. The computer system of claim 15, wherein the legitimate program function is part of a web browser installed in the computer system.

18. The computer system of claim 15, wherein the program instructions block the malicious program by terminating the malicious program.

19. The computer system of claim 15, wherein the program instructions block the malicious program by denying a memory allocation needed to store at least part of the concatenated character string in the computer system.

20. The computer system of claim 15, further comprising program instructions, stored on at least one of the one or more storage devices for execution by at least one of the one or more processors via at least one of the one or more memories, to hook the legitimate program function to detect a total length of the concatenated character string, and wherein the program instructions to determine whether the total length of the copies of the character string already concatenated by the legitimate program function exceeds the predetermined threshold is responsive the program instructions to hook the legitimate program function to detect a length of the concatenated character string.

* * * * *